US012658109B2

(12) United States Patent
Liao et al.

(10) Patent No.: US 12,658,109 B2
(45) Date of Patent: Jun. 16, 2026

(54) DISPLAY PANEL

(71) Applicant: AUO Corporation, Hsinchu City (TW)

(72) Inventors: Tzu Chiang Liao, Hsinchu City (TW); Lung-Ling Tang, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 18/824,914

(22) Filed: Sep. 5, 2024

(65) Prior Publication Data

US 2025/0232707 A1 Jul. 17, 2025

(30) Foreign Application Priority Data

Jan. 15, 2024 (TW) ................................ 113101521

(51) Int. Cl.
*G09G 3/32* (2016.01)
*G09G 3/34* (2006.01)

(52) U.S. Cl.
CPC ............. *G09G 3/32* (2013.01); *G09G 3/3426* (2013.01); *G09G 2300/0426* (2013.01)

(58) Field of Classification Search
None
See application file for complete search history.

(56) References Cited

U.S. PATENT DOCUMENTS 10,170,045 B2 * 1/2019 Yamanaka ........... G09G 3/3266
11,074,854 B1 7/2021 Lu et al.
11,164,512 B2 11/2021 Chaji
11,302,244 B2 4/2022 Chaji
11,610,535 B2 3/2023 Chaji
11,899,282 B2 2/2024 Ponte et al.
11,948,503 B2 4/2024 Chaji
12,051,359 B2 7/2024 Chaji
D1,052,267 S 11/2024 Ponte et al.
2015/0109278 A1 * 4/2015 Kim ..................... G09G 3/3233 345/82
2015/0235620 A1 * 8/2015 Takahota ................. G09G 5/10 345/99
2016/0012774 A1 * 1/2016 Ohara .................. G09G 3/3225 345/694

(Continued)

FOREIGN PATENT DOCUMENTS

CN 109493744 3/2019
CN 110856450 2/2020

(Continued)

*Primary Examiner* — Patrick N Edouard
*Assistant Examiner* — Peijie Shen
(74) *Attorney, Agent, or Firm* — JCIPRNET

(57) ABSTRACT

A display panel is provided. The display panel includes multiple emission circuits, multiple emission control circuits, multiple pixel circuits, and multiple emission control lines. The emission circuit receives multiple clock signals to provide multiple emission signals. The emission control circuit receives one of the emission signals and receives multiple emission control signals to provide multiple pixel emission signals based on the received emission signal and the emission control signals. The pixel circuits are arranged in an array. The emission control lines are respectively coupled to one of the emission control circuits and pixel circuits of a same color among the pixel circuits in a row to transmit a corresponding one of the pixel emission signals to the coupled pixel circuits.

9 Claims, 6 Drawing Sheets

(56) References Cited

U.S. PATENT DOCUMENTS

| | | | | |
|---|---|---|---|---|
| 2016/0210892 | A1* | 7/2016 | Ohara | G09G 3/2022 |
| 2016/0275845 | A1* | 9/2016 | Tsai | G09G 3/2003 |
| 2017/0200415 | A1* | 7/2017 | Noguchi | H10D 86/423 |
| 2019/0164498 | A1* | 5/2019 | Jang | G09G 3/3266 |
| 2020/0234640 | A1* | 7/2020 | Ohara | G09G 3/3233 |
| 2020/0333628 | A1 | 10/2020 | Ponte et al. | |
| 2021/0398482 | A1* | 12/2021 | Wang | G09G 3/3233 |
| 2023/0206843 | A1* | 6/2023 | Lee | H10K 59/131<br>345/55 |
| 2024/0369853 | A1 | 11/2024 | Ponte et al. | |
| 2025/0218350 | A1* | 7/2025 | Lee | G09G 3/32 |

FOREIGN PATENT DOCUMENTS

| | | | | |
|---|---|---|---|---|
| CN | 110992885 | | 4/2020 | |
| CN | 112652266 | | 4/2021 | |
| CN | 113380188 | | 9/2021 | |
| CN | 113707086 | | 11/2021 | |
| CN | 117542286 | * | 11/2023 | |
| CN | 117542286 A | * | 2/2024 | G09F 9/33 |

* cited by examiner

DISPLAY PANEL

CROSS-REFERENCE TO RELATED APPLICATION

This application claims the priority benefit of Taiwan application serial no. 113101521, filed on Jan. 15, 2024. The entirety of the above-mentioned patent application is hereby incorporated by reference herein and made a part of this specification.

BACKGROUND

Technical Field

The disclosure relates to a display panel, and in particular to a self-emissive display panel.

Description of Related Art

In recent years, self-emission display technology has become the mainstream of display devices due to advantages such as low power consumption, thinner display panels, bright colors, and more obvious contrast. In addition, the self-emission display technology has also overcome the issue of dynamic blur. In a self-emissive display panel, since light emitting diodes of different colors are implemented using different semiconductor materials, the light emitting diodes of different colors need to be independently adjusted to achieve high-efficiency driving. In order to achieve the purpose of independently adjusting emission periods of pixels of different colors such that the pixels operate in a high-efficiency interval, the circuit design requires circuits that may independently control the pixels of different colors for emission, and may then be matched with the respective control signals. However, such configuration requires more signal lines, which occupy a large layout space.

SUMMARY

The disclosure provides a display panel, which can enable pixel circuits of different colors to independently adjust the emission time and reduce the number of required signals to reduce the layout area of required wiring.

A display panel of the disclosure includes multiple emission circuits, multiple emission control circuits, multiple pixel circuits, and multiple emission control lines. The emission circuit receives multiple clock signals to provide multiple emission signals. The emission control circuit receives one of the emission signals and receives multiple emission control signals to provide multiple pixel emission signals based on the received emission signal and the emission control signals. The pixel circuits are arranged in an array. The emission control lines are respectively coupled to one of the emission control circuits and pixel circuits of a same color among the pixel circuits in a row to transmit a corresponding one of the pixel emission signals to the coupled pixel circuits.

Based on the above, in the display panel according to the embodiments of the disclosure, the emission control circuit generates the pixel emission signal based on the emission signal and the emission control signal. The pulse widths of the pixel emission signals corresponding to the same color may be set or adjusted according to the same emission control signal. Therefore, the emission time of the pixel circuits of the same color may be adjusted independently of pixel circuits of other colors to reduce the number of required control signals (for example, the clock signals and the emission control signals), that is, the layout area of the required wiring can be reduced.

In order for the features and advantages of the disclosure to be more comprehensible, the following specific embodiments are described in detail in conjunction with the drawings.

DESCRIPTION OF THE EMBODIMENTS

Unless otherwise defined, all terms (including technical and scientific terms) used herein have the same meaning as commonly understood by persons of ordinary skill in the art to which the disclosure belongs. It will be further understood that terms such as the terms defined in commonly used dictionaries should be construed to have meanings consistent with the meanings in the related art and the context of the disclosure and are not to be construed to have idealistic or overly formal meanings, unless expressly so defined herein.

It will be understood that although terms such as "first", "second", and "third" may be used herein to describe various elements, components, regions, layers, and/or parts, the elements, components, regions, layers, and/or parts should not be limited by the terms. The terms are only used to distinguish one element, component, region, layer, or part from another element, component, region, layer, or part. Thus, a "first element", "component", "region", "layer", or "part" discussed below may be referred to as a second element, component, region, layer, or part without departing from the teachings herein.

Terms used herein are only for the purpose of describing, instead of limiting, particular embodiments. As used herein, the singular forms "a", "an", and "the" are intended to include the plural forms including "at least one" unless the content clearly dictates otherwise. "Or" means "and/or". As used herein, the term "and/or" includes any and all combinations of one or more of the related listed items. It will also be understood that when used in the specification, the terms "comprises" and/or "includes" designate the presence of a stated feature, region, entirety, step, operation, element, and/or component, but do not exclude the presence or the addition of one or more other features, regions, entireties, steps, operations, elements, components, and/or a combination thereof.

Figure 1:
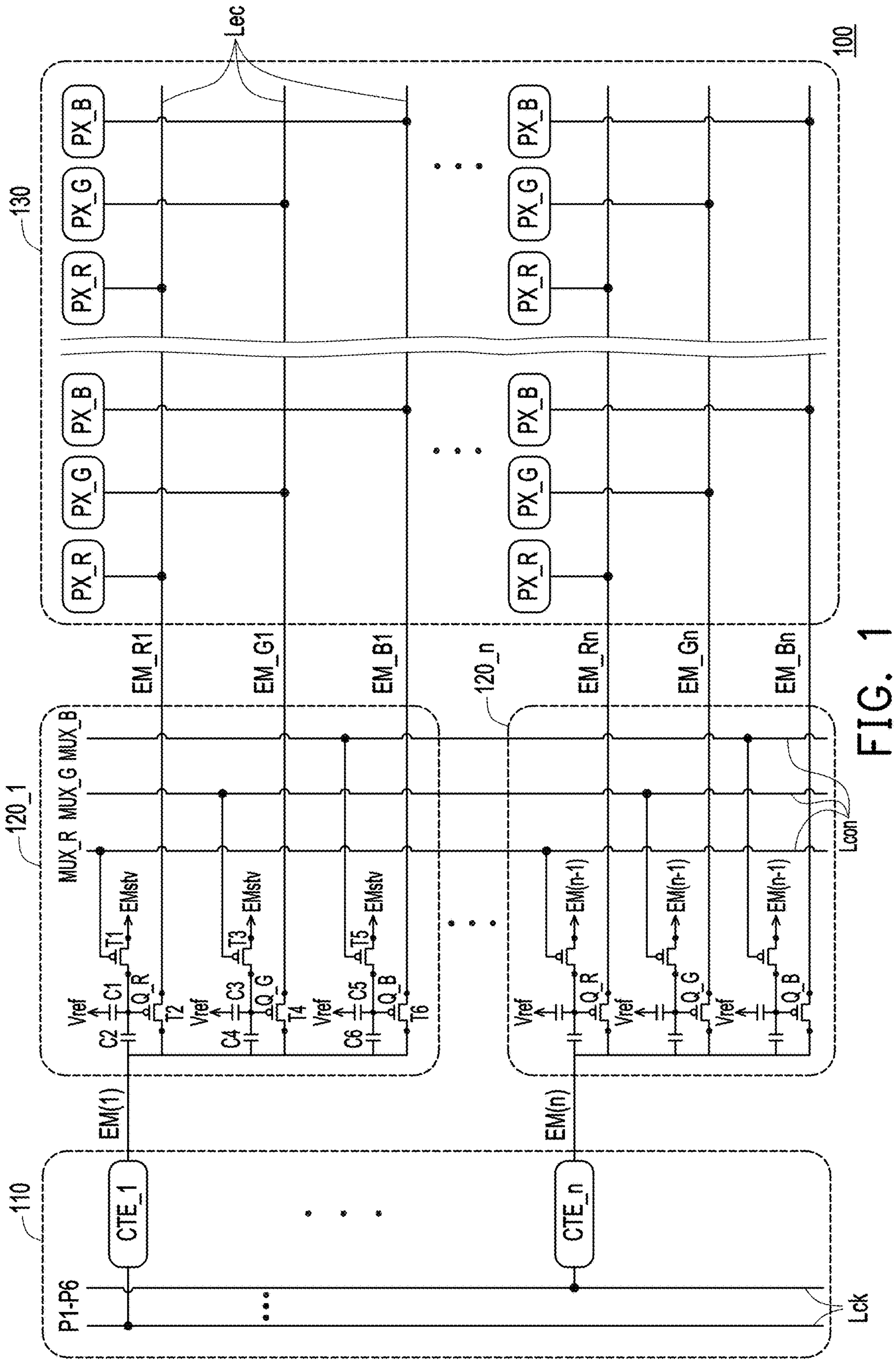
FIG. 1 is a system schematic diagram of a display panel according to an embodiment of the disclosure.

FIG. 1 is a system schematic diagram of a display panel according to an embodiment of the disclosure. Please refer to FIG. 1. In the embodiment, the display panel 100 includes an emission driver 110, multiple emission control circuits 120_1 to **120_*n*, and a pixel array 130, where n is a positive integer greater than or equal to 1. The emission driver 110 includes multiple emission circuits CTE_1 to CTE_n. The emission circuits CTE_1 to CTE_n receive multiple clock signals (6 clock signals P1 to P6 are taken as an example here) to provide multiple emission signals EM(1**) to EM(n).

The emission control circuits 120_1 to **120_*n* respectively receive one of the emission signals EM(1) to EM(n). For example, the emission control circuit 120_1 receives the emission signal EM(1), and the emission control circuit 120_*n* receives the emission signal EM(n). Moreover, the emission control circuits 120_1 to 120_*n* jointly receive emission control signals (for example, a red emission control signal MUX_R (corresponding to a first emission control signal), a green emission control signal MUX_G (corresponding to a second emission control signal), a blue emission control signal MUX_B (corresponding to the second emission control signal)) to provide multiple pixel emission signals (for example, red pixel emission signals EM_R1 and EM_Rn (corresponding to first pixel emission signals), green pixel emission signals EM_G1 and EM_Gn (corresponding to second pixel emission signals), and blue pixel emission signals EM_B1 and EM_Bn (corresponding to third pixel emission signals)) based on the received emission signals (for example, EM(1**) to EM(n)) and the red emission control signal MUX_R, the green emission control signal MUX_G, and the blue emission control signal MUX_B.

The pixels array 130 includes multiple pixel circuits (for example, red pixel circuits PX_R, green pixel circuits PX_G, and blue pixel circuits PX_B) arranged in an array and multiple emission control lines Lec. The emission control lines Lec are respectively coupled to one of the emission control circuits 120_1 to **120_*n* and the pixel circuits of the same color (for example, the red pixel circuits PX_R, the green pixel circuits PX_G, or the blue pixel circuits PX_B) among the pixel circuits in a row to transmit a corresponding one of the red pixel emission signals EM_R1 and EM_Rn, the green pixel emission signals EM_G1 and EM_Gn, and the blue pixel emission signals EM_B1** and EM_Bn to a red pixel circuit PX_R, a green pixel circuit PX_G, or a blue pixel circuit PX_B among the coupled pixel circuits in the row.

According to the above, the pixel emission signals (for example, the red pixel emission signals EM_R1 and EM_Rn, the green pixel emission signals EM_G1 and EM_Gn, or the blue pixel emission signals EM_B1 and EM_Bn) for controlling the pixel circuits of the same color are generated according to the corresponding one of the red emission control signal MUX_R, the green emission control signal MUX_G, and the blue emission control signal MUX_B. That is, the pulse widths of the red pixel emission signals EM_R1 and EM_Rn may be synchronously set or adjusted according to the red emission control signal MUX_R, the pulse widths of the green pixel emission signals EM_G1 and EM_Gn may be synchronously set or adjusted according to the green emission control signal MUX_G, and the pulse widths of the blue pixel emission signals EM_B1 and EM_Bn may be synchronously set or adjusted according to the blue emission control signal MUX_B. Therefore, the emission time of the red pixel circuit PX_R, the green pixel circuit PX_G, and the blue pixel circuit PX_B may be independently adjusted, and the number of required control signals (for example, the clock signals and the emission control signals) may be reduced to reduce the layout area of required wiring.

In the embodiment of the disclosure, each emission control circuit (for example, 120_1 or **120_*n*) includes transistors T1 to T6 (corresponding to a first transistor to a sixth transistor) and capacitors C1 to C6 (corresponding to a first capacitor to a sixth capacitor), wherein the transistors T1 to T6** take P-type transistors as an example.

Taking the emission control circuit 120_1 as an example, the transistor T1 has a first terminal, a control terminal receiving the red emission control signal MUX_R, and a second terminal receiving a start emission signal EMstv. The capacitor C1 is coupled between the first terminal of the transistor T1 and a reference voltage Vref. The capacitor C2 is coupled between the corresponding emission circuit CTE_1 and the first terminal of the transistor T1, that is, coupled between the emission signal EM(1) and the first terminal of the transistor T1. The transistor T2 has a first terminal receiving the corresponding emission signal EM(1), a control terminal coupled to the first terminal of the transistor T1, and a second terminal providing the red pixel emission signal EM_R1.

The transistor T3 has a first terminal, a control terminal receiving the green emission control signal MUX_G, and a second terminal receiving the start emission signal EMstv. The capacitor C3 is coupled between the first terminal of the transistor T3 and the reference voltage Vref. The capacitor C4 is coupled between the corresponding emission circuit CTE_1 and the first terminal of the transistor T3, that is, coupled between the emission signal EM(1) and the first terminal of the transistor T3. The transistor T4 has a first terminal receiving the corresponding emission signal EM(1), a control terminal coupled to the first terminal of the transistor T3, and a second terminal providing the green pixel emission signal EM_G1.

The transistor T5 has a first terminal, a control terminal receiving the blue emission control signal MUX_B, and a second terminal receiving the start emission signal EMstv. The capacitor C5 is coupled between the first terminal of the transistor T5 and the reference voltage Vref. The capacitor C6 is coupled between the corresponding emission circuit CTE_1 and the first terminal of the transistor T5, that is, coupled between the emission signal EM(1) and the first terminal of the transistor T5. The transistor T6 has a first terminal receiving the corresponding emission signal EM(1), a control terminal coupled to the first terminal of the transistor T5, and a second terminal providing the blue pixel emission signal EM_B1.

In the embodiment of the disclosure, the circuit structure of the emission control circuit **120_*n* is similar to the emission control circuit 120_1. The difference is that the emission control circuit 120_*n* is coupled to the emission circuit CTE_n to receive the emission signal EM(n) and provide the red pixel emission signal EM_Rn, the green pixel emission signal EM_Gn, and the blue pixel emission signal EM_Bn, wherein the second terminals of the transistors T1, T3, and T5 of the emission control circuit 120_*n*** receive the previous emission signal EM(n−1). Reference may be made to the above embodiment for the rest, which will not be described again here.

In the embodiment of the disclosure, the display panel 100 may be further provided with multiple clock signal lines Lck and multiple control signal lines Lcon, wherein the extension directions of the clock signal lines Lck and the control signal lines Lcon may be substantially perpendicular to the emission control lines Lec. Moreover, the clock signal lines Lck are used to transmit the clock signals (for example, P1 to P6), and the control signal lines Lcon are used to transmit the emission control signals (for example, the red emission control signal MUX_R, the green emission control signal MUX_G, and the blue emission control signal MUX_B).

Figure 2:
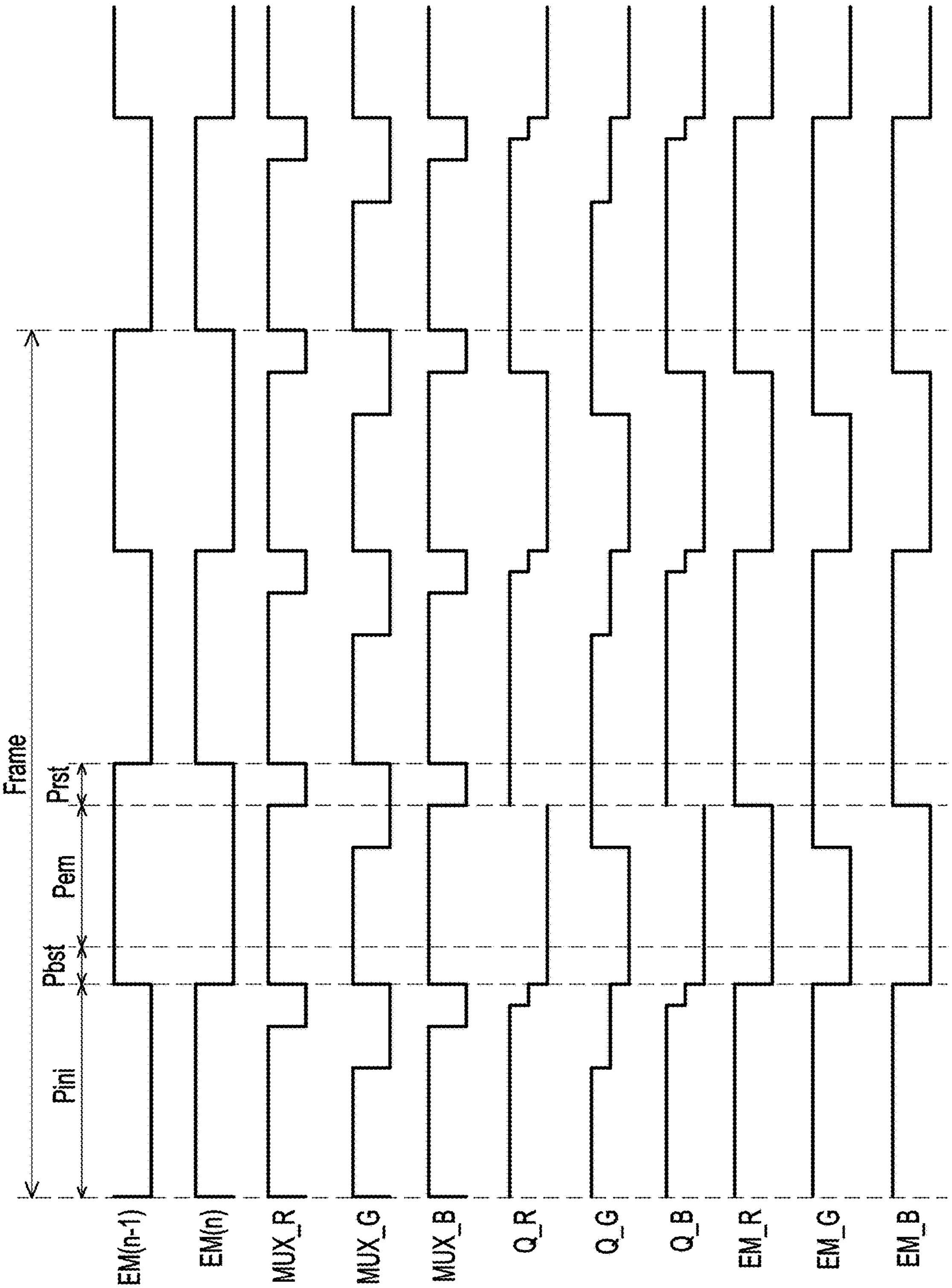
FIG. 2 is a schematic diagram of a driving waveform of an emission control circuit according to an embodiment of the disclosure.

FIG. 2 is a schematic diagram of a driving waveform of an emission control circuit according to an embodiment of the disclosure. Please refer to FIG. 1 and FIG. 2. In the embodiment, the red emission control signal MUX_R, the green emission control signal MUX_G, and the blue emission control signal MUX_B may be high-frequency signals, that is, the number of transitions (the number of times of transitioning from a high level to a low level or from a low level to a high level) during a single screen period Frame is greater than or equal to 2. The same or similar elements use the same or similar reference numerals.

Each driving cycle is roughly divided into four phases, that is, an initial period Pini, a boost period Pbst, an emission period Pem, and a reset period Prst. During the initial period Pini, the red emission control signal MUX_R, the green emission control signal MUX_G, and the blue emission control signal MUX_B switch from a high level to a low level, so that the low level of the previous emission signal EM(n−1) is infused into the control terminals (as shown by voltages Q_R, Q_G, and Q_B) of the transistors T2, T4, and T6. Then, during the boost period Pbst, the low level of the emission signal EM(n) further pulls down the voltage levels of the control terminals of the transistors T2, T4, and T6 to accelerate the conduction degree (or the conduction speed) of the transistors T2, T4, and T6.

During the emission period Pem, the conducted transistors T2, T4, and T6 output the low level of the emission signal EM(n) to provide a red pixel emission signal EM_R, a green pixel emission signal EM_G, and a blue pixel emission signal EM_B to light up the red pixel circuit PX_R, the green pixel circuit PX_G, and the blue pixel circuit PX_B, wherein the red emission control signal MUX_R, the green emission control signal MUX_G, and the blue emission control signal MUX_B are at high voltage levels to cut off the transistors T1, T3, and T5, so that the voltage levels of the control terminals of the transistors T2, T4, and T6 are roughly maintained at even lower levels, that is, the transistors T2, T4, and T6 remain conducted. Then, the red emission control signal MUX_R, the green emission control signal MUX_G, and the blue emission control signal MUX_B switch from the high voltage levels to the low voltage levels to conduct the transistors T1, T3, and T5. At this time, the high level of the previous emission signal EM(n−1) is infused into the control terminals of the transistors T2, T4, and T6 to cut off the transistors T2, T4, and T6. Thereby, the time when the red emission control signal MUX_R, the green emission control signal MUX_G, and the blue emission control signal MUX_B are at the high voltage levels substantially correspondingly controls the time when the red pixel circuit PX_R, the green pixel circuit PX_G, and the blue pixel circuit PX_B light up.

During the reset period Prst, the red emission control signal MUX_R, the green emission control signal MUX_G, and the blue emission control signal MUX_B switch to low voltage levels, so that the voltages of the control terminals of the transistors T2, T4, and T6 remain at the high levels.

Figure 3:
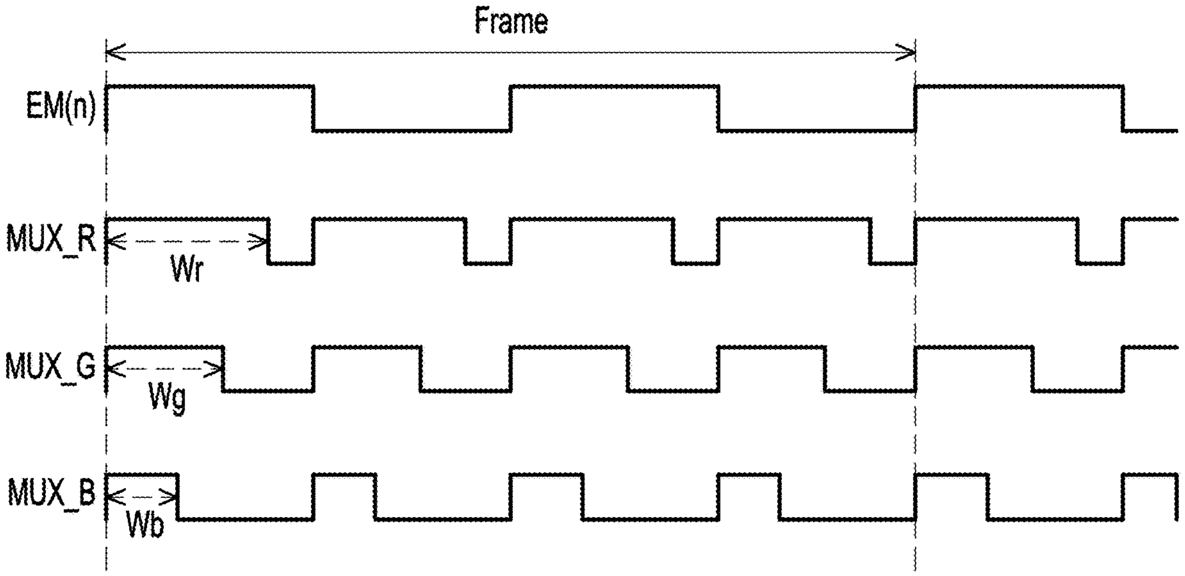
FIG. 3 is a schematic diagram of a driving waveform of an emission control circuit according to another embodiment of the disclosure.

FIG. 3 is a schematic diagram of a driving waveform of an emission control circuit according to another embodiment of the disclosure. Please refer to FIG. 1 to FIG. 3. In the embodiment, pulse widths Wr, Wg, and Wb of the red emission control signal MUX_R, the green emission control signal MUX_G, and the blue emission control signal MUX_B may be different from each other. For example, the pulse width Wr may be 75%, the pulse width Wg may be 50%, and the pulse width Wb may be 25%. Thereby, the red emission control signal MUX_R, the green emission control signal MUX_G, and the blue emission control signal MUX_B may be adaptively adjusted according to electrical characteristics of light emitting diodes.

However, in the embodiment of the disclosure, the pulse widths Wr, Wg, and Wb of the red emission control signal MUX_R, the green emission control signal MUX_G, and the blue emission control signal MUX_B may be the same as each other, or the pulse width (for example, Wr, Wg, or Wb) of at least one of the red emission control signal MUX_R, the green emission control signal MUX_G, and the blue emission control signal MUX_B may be different from the pulse widths (for example, Wr, Wg, and/or Wb) of the others, which is determined according to the circuit design, and the embodiment of the disclosure is not limited thereto.

Figure 4:
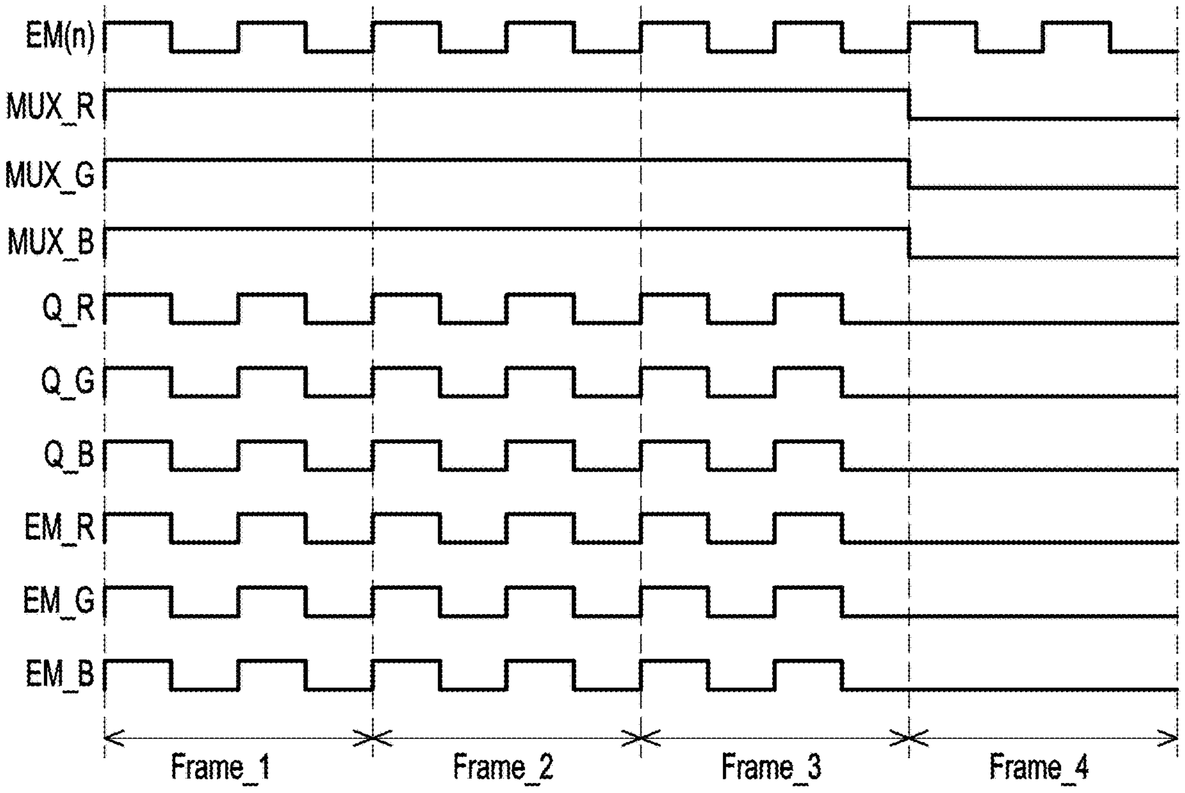
FIG. 4 is a schematic diagram of a driving waveform of an emission control circuit according to yet another embodiment of the disclosure.
Figure 5:
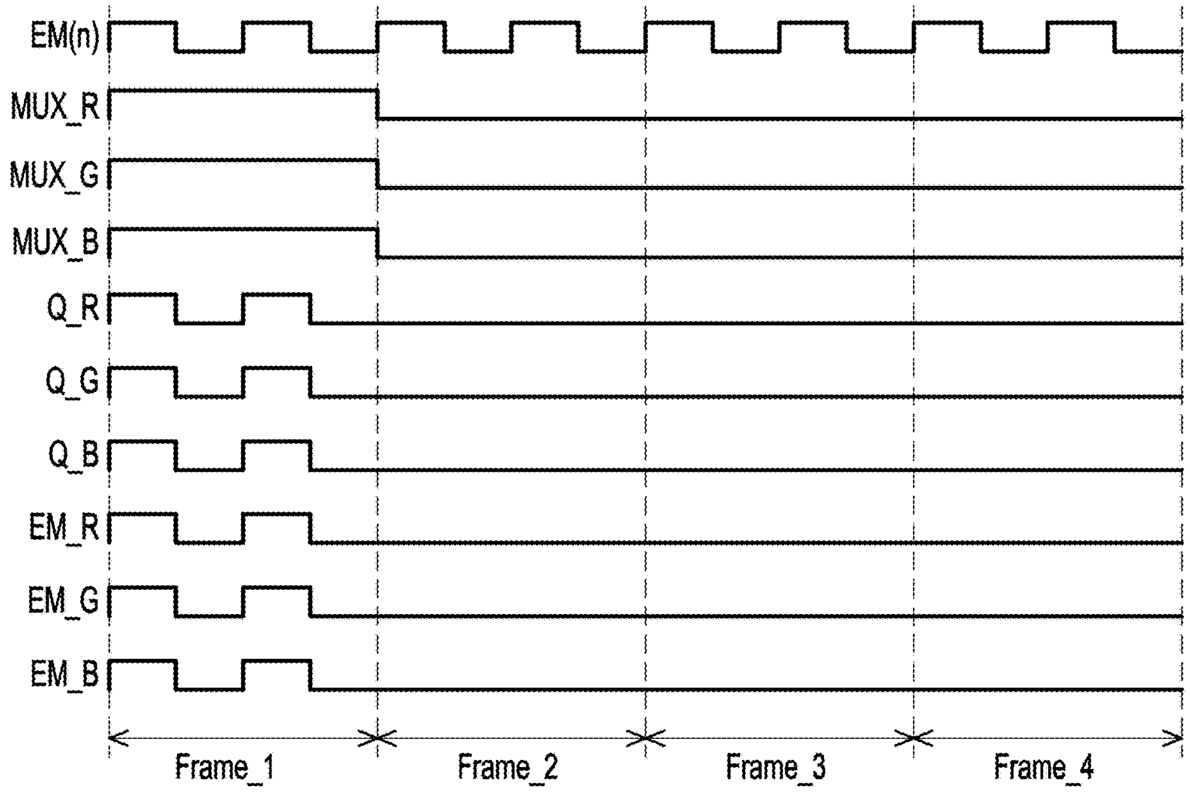
FIG. 5 is a schematic diagram of a driving waveform of an emission control circuit according to still another embodiment of the disclosure.

FIG. 4 is a schematic diagram of a driving waveform of an emission control circuit according to yet another embodiment of the disclosure. FIG. 5 is a schematic diagram of a driving waveform of an emission control circuit according to still another embodiment of the disclosure. Please refer to FIG. 1 to FIG. 5. In the embodiments of FIG. 4 and FIG. 5, 4 screen periods (that is, screen periods Frame_1 to Frame_4) are, for example, used as a basis (or a unit) to adjust the red emission control signal MUX_R, the green emission control signal MUX_G, and the blue emission control signal MUX_B. In other words, the red emission control signal MUX_R, the green emission control signal MUX_G, and the blue emission control signal MUX_B are low-frequency signals here, that is, the number of transitions (the number of times of transitioning from a high level to a low level or from a low level to a high level) during a single screen period Frame is less than or equal to 1.

Furthermore, in the embodiment of FIG. 4, the time lengths of the pulse widths of the red emission control signal MUX_R, the green emission control signal MUX_G, and the blue emission control signal MUX_B are 3 screen periods (that is, the screen periods Frame_1 to Frame_3). Relative to 4 screen periods (that is, the screen periods Frame_1 to Frame_4), the pulse widths of the red emission control signal MUX_R, the green emission control signal MUX_G, and the blue emission control signal MUX_B are 75%. In the embodiment of FIG. 5, the time lengths of the pulse widths of the emission control signals MUX_R, MUX_G, and MUX_B are 1 screen period (that is, the screen period Frame_1). Relative to 4 screen periods (that is, the screen periods Frame_1 to Frame_4), the pulse widths of the red emission control signal MUX_R, the green emission control signal MUX_G, and the blue emission control signal MUX_B are 25%. In the embodiments of FIG. 4 and FIG. 5, since the pulse widths of the red emission control signal MUX_R, the green emission control signal MUX_G, and the blue emission control signal MUX_B are long, there is no function of the boost period Pbst. Moreover, in the embodiments of FIG. 4 and FIG. 5, the pulse widths of the red emission control signal MUX_R, the green emission control signal MUX_G, and the blue emission control signal MUX_B are shown to be the same as each other. However, in the embodiment of the disclosure, the pulse width of at least one of the red emission control signal MUX_R, the green emission control signal MUX_G, and the blue emission control signal MUX_B may occasionally be different from the pulse widths of the others, which is determined according to the circuit design, and the embodiment of the disclosure is not limited thereto.

Figure 6C:
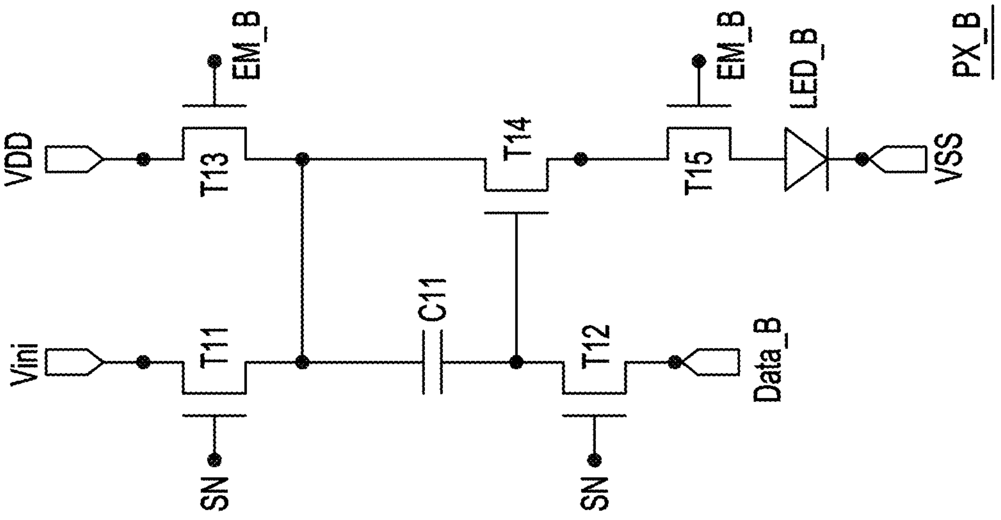
FIG. 6A to FIG. 6C are respectively a system schematic diagram of a pixel circuit according to an embodiment of the disclosure.
Figure 6B:
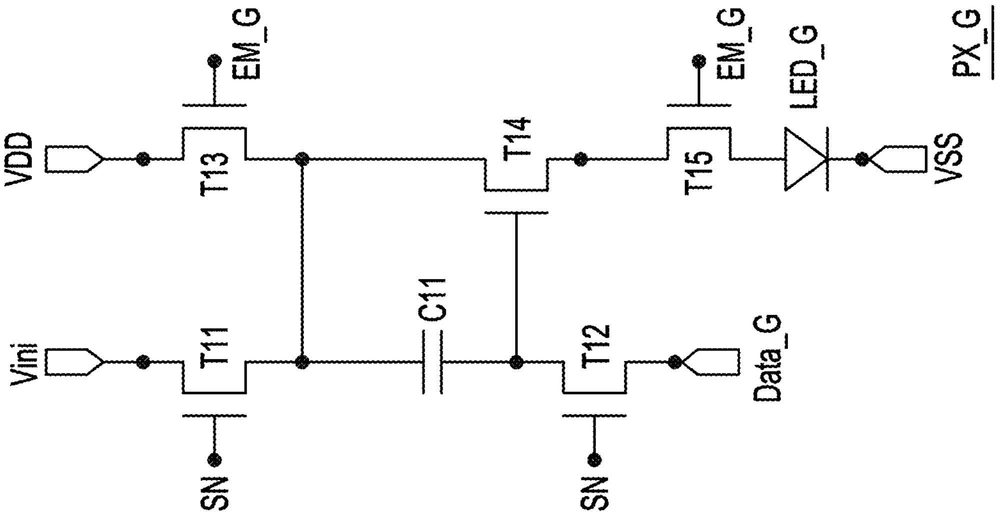
Figure 6A:
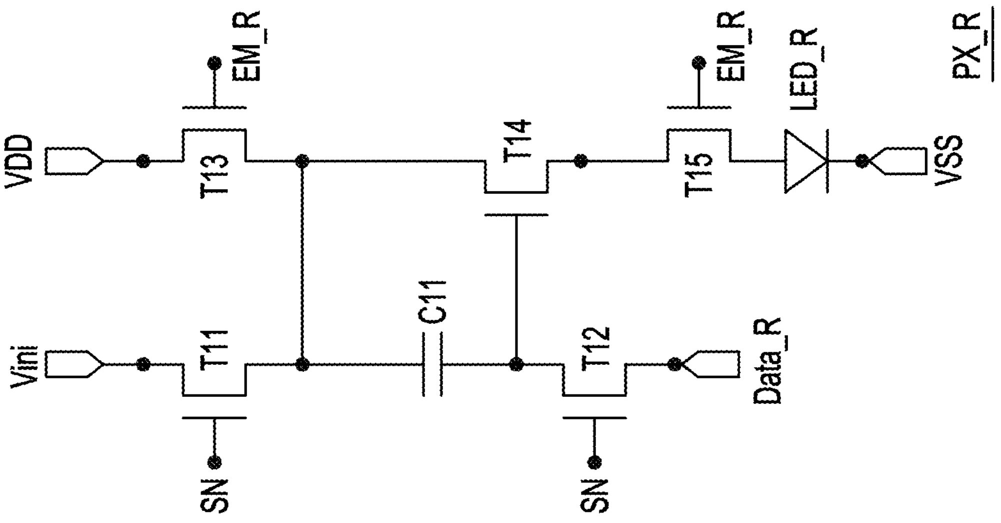

FIG. 6A to FIG. 6C are respectively a system schematic diagram of a pixel circuit according to an embodiment of the disclosure. Please refer to FIG. 1 and FIG. 6A. In the embodiment, the red pixel circuit PX_R includes, for example, a red light emitting diode LED_R, transistors T11 to T15 (corresponding to a seventh transistor to an eleventh transistor), and a capacitor C11 (corresponding to a seventh capacitor), wherein the transistors T11 to T15 take N-type transistors as an example, and the same or similar elements use the same or similar reference numerals.

The red light emitting diode LED_R has an anode and a cathode receiving a system low voltage VSS. The transistor T11 has a first terminal receiving an initial voltage *Vini*, a control terminal receiving a scan signal SN, and a second terminal. The transistor T12 has a first terminal, a control terminal receiving the scan signal SN, and a second terminal receiving a red data voltage Data_R. The capacitor C11 is coupled between the second terminal of the transistor T11 and the first terminal of the transistor T12. The transistor T13 has a first terminal receiving a system high voltage VDD, a control terminal receiving a pixel emission signal EM_R, and a second terminal coupled to the second terminal of the transistor T11.

The transistor T14 has a first terminal coupled to the second terminal of the transistor T11, a control terminal coupled to the first terminal of the transistor T12, and a second terminal. The transistor T15 has a first terminal coupled to the second terminal of the transistor T14, a control terminal receiving the red pixel emission signal EM_R, and a second terminal coupled to the anode of the red light emitting diode LED_R.

Please refer to FIG. 1, FIG. 6A, and FIG. 6B. In the embodiment, the green pixel circuit PX_G is roughly the same as the red pixel circuit PX_R. The main difference lies in a green light emitting diode LED_G, wherein the second terminal of the transistor T12 of the green pixel circuit PX_G receives a green data voltage Data_G, and the control terminals of the transistors T13 and T15 of the green pixel circuit PX_G receive a green pixel emission signal EM_G.

Please refer to FIG. 1, FIG. 6A, and FIG. 6C. In the embodiment, the blue pixel circuit PX_B is roughly the same as the red pixel circuit PX_R. The main difference lies in a blue light emitting diode LED_B, wherein the second terminal of the transistor T12 of the blue pixel circuit PX_B receives a blue data voltage Data_B, and the control terminals of the transistors T13 and T15 of the blue pixel circuit PX_B receive a blue pixel emission signal EM_B.

In summary, in the display panel according to the embodiments of the disclosure, the emission control circuit generates the pixel emission signal based on the emission signal and the emission control signal, wherein the pulse widths of the pixel emission signals corresponding to the same color may be set or adjusted according to the same emission control signal. Therefore, the emission time of the pixel circuits of the same color may be adjusted independently of pixel circuits of other colors to reduce the number of required control signals (for example, the clock signals and the emission control signals), that is, the layout area of the required wiring can be reduced.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A display panel, comprising:

a plurality of emission circuits, receiving a plurality of clock signals to provide a plurality of emission signals;

a plurality of emission control circuits, respectively receiving a previous emission signal, one of the emission signals and receiving a plurality of emission control signals to provide a plurality of pixel emission signals based on the previous emission signal, the received emission signal and the emission control signals;

a plurality of pixel circuits, arranged in an array;

a plurality of emission control lines, respectively coupled to one of the emission control circuits and pixel circuits of a same color among the pixel circuits in a row to transmit a corresponding one of the pixel emission signals to the coupled pixel circuits, wherein each of the emission control circuits comprises:

a first transistor, having a first terminal, a control terminal receiving a first emission control signal among the emission control signals, and a second terminal receiving the previous emission signal;

a first capacitor, coupled between the first terminal of the first transistor and a reference voltage;

a second capacitor, coupled between a corresponding one of the emission circuits and the first terminal of the first transistor;

a second transistor, having a first terminal receiving a corresponding one of the emission signals, a control terminal coupled to the first terminal of the first transistor, and a second terminal providing a first pixel emission signal among the pixel emission signals;

a third transistor, having a first terminal, a control terminal receiving a second emission control signal among the emission control signals, and a second terminal receiving the previous emission signal;

a third capacitor, coupled between the first terminal of the third transistor and the reference voltage;

a fourth capacitor, coupled between the corresponding one of the emission circuits and the first terminal of the third transistor;

a fourth transistor, having a first terminal receiving the corresponding one of the emission signals, a control terminal coupled to the first terminal of the third transistor, and a second terminal providing a second pixel emission signal among the pixel emission signals;

a fifth transistor, having a first terminal, a control terminal receiving a third emission control signal among the emission control signals, and a second terminal receiving the previous emission signal;

a fifth capacitor, coupled between the first terminal of the fifth transistor and the reference voltage;

a sixth capacitor, coupled between the corresponding one of the emission circuits and the first terminal of the fifth transistor; and a sixth transistor, having a first terminal receiving the corresponding one of the emission signals, a control terminal coupled to the first terminal of the fifth transistor, and a second terminal providing a third pixel emission signal among the pixel emission signals.

2. The display panel according to claim 1, wherein the emission control signals are a low-frequency signal.

3. The display panel according to claim 2, wherein a number of transitions of the low-frequency signal during a single screen period is less than or equal to 1.

4. The display panel according to claim 1, wherein the emission control signals are a high-frequency signal.

5. The display panel according to claim 4, wherein a number of transitions of the high-frequency signal during a single screen period is greater than or equal to 2.

6. The display panel according to claim 1, further comprising a plurality of clock signal lines and a plurality of control signal lines, wherein the clock signal lines transmit the clock signals, and the control signal lines transmit the emission control signals.

7. The display panel according to claim 1, wherein the pixel circuits comprise a plurality of red light emitting diode pixel circuits, a plurality of green light emitting diode pixel circuits, and a plurality of blue light emitting diode pixel circuits.

8. The display panel according to claim 1, wherein a pulse width of at least one of the emission control signals is different from pulse widths of the other emission control signals.

9. The display panel according to claim 1, wherein the pixel circuits respectively comprise:

a light emitting diode, having an anode and a cathode receiving a system low voltage;

a seventh transistor, having a first terminal receiving an initial voltage, a control terminal receiving a scan signal, and a second terminal;

an eighth transistor, having a first terminal, a control terminal receiving the scan signal, and a second terminal receiving a data voltage;

a seventh capacitor, coupled between the second terminal of the seventh transistor and the first terminal of the eighth transistor;

a nineth transistor, having a first terminal receiving a system high voltage, a control terminal receiving the corresponding one of the pixel emission signals, and a second terminal coupled to the second terminal of the seventh transistor;

a tenth transistor, having a first terminal coupled to the second terminal of the seventh transistor, a control terminal coupled to the first terminal of the eighth transistor, and a second terminal; and an eleventh transistor, having a first terminal coupled to the second terminal of the tenth transistor, a control terminal receiving the corresponding one of the pixel emission signals, and a second terminal coupled to the anode of the light emitting diode.

* * * * *